United States Patent
Wu

(10) Patent No.: US 11,170,087 B2
(45) Date of Patent: Nov. 9, 2021

(54) VIRTUAL REALITY SCENE-BASED BUSINESS VERIFICATION METHOD AND DEVICE

(71) Applicant: ADVANCED NEW TECHNOLOGIES CO., LTD., Grand Cayman (KY)

(72) Inventor: Jun Wu, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 155 days.

(21) Appl. No.: 16/535,887

(22) Filed: Aug. 8, 2019

(65) Prior Publication Data

US 2019/0362063 A1 Nov. 28, 2019

Related U.S. Application Data

(63) Continuation of application No. PCT/CN2018/076532, filed on Feb. 12, 2018.

(30) Foreign Application Priority Data

Feb. 23, 2017 (CN) .......................... 201710100962.8

(51) Int. Cl.
*G06F 21/32* (2013.01)
*G06F 3/01* (2006.01)
(Continued)

(52) U.S. Cl.
CPC .............. *G06F 21/32* (2013.01); *G06F 3/013* (2013.01); *G06K 9/0061* (2013.01); *G06T 19/006* (2013.01)

(58) Field of Classification Search
CPC .......... G06F 21/32; G06F 3/013; G06F 3/017; G06F 3/012; G06F 3/011; G06K 9/0061;
(Continued)

(56) References Cited

U.S. PATENT DOCUMENTS 9,292,973 B2  3/2016  Bar-Zeev et al.
9,588,341 B2  3/2017  Bar-Zeev et al.
(Continued)

FOREIGN PATENT DOCUMENTS

CN   101634750 A   1/2010
CN   103426195 A   12/2013
(Continued)

OTHER PUBLICATIONS

First Office Action and First Search for Taiwanese Application No. 106140069 dated Mar. 18, 2019, 14 pages.
(Continued)

*Primary Examiner* — Christopher A Revak

(57) ABSTRACT

Methods, systems, and apparatus, including computer programs encoded on computer storage media, for a virtual reality (VR)-based service verification method are provided. One of the methods includes: detecting a target service triggered by a visual focus of a user in a VR scene, wherein the target service requires security verification; acquiring, by eye recognition hardware, one or more eye physiological features from the user; comparing one of the acquired eye physiological features with a corresponding pre-stored eye physiological feature samples; and determining whether the security verification of the target service has succeed based on a comparison result. This method improves the accuracy and speed of security verification of a service in a VR scene.

17 Claims, 2 Drawing Sheets

(51) Int. Cl.
*G06K 9/00* (2006.01)
*G06T 19/00* (2011.01)

(58) Field of Classification Search
CPC . G06T 19/006; G06T 19/003; H04L 63/0861; H04L 67/38; G06Q 20/40145
See application file for complete search history.

(56) References Cited

U.S. PATENT DOCUMENTS

| | | | |
|---|---|---|---|
| 10,156,900 | B2 | 12/2018 | Publicover et al. |
| 2009/0295683 | A1 | 12/2009 | Pugh et al. |
| 2014/0337634 | A1 | 11/2014 | Starner |
| 2015/0205126 | A1 | 7/2015 | Schowengerdt |
| 2015/0301797 | A1 | 10/2015 | Miller |
| 2015/0324568 | A1 | 11/2015 | Publicover et al. |
| 2016/0085302 | A1 | 3/2016 | Publicover et al. |
| 2016/0187976 | A1 | 6/2016 | Levesque et al. |
| 2016/0191910 | A1 | 6/2016 | Von Und |
| 2016/0335512 | A1 | 11/2016 | Bradski |
| 2016/0358181 | A1* | 12/2016 | Bradski ............... G06F 3/011 |
| 2017/0131765 | A1* | 5/2017 | Perek ............... G02B 5/3083 |
| 2017/0135577 | A1 | 5/2017 | Komogortsev |
| 2017/0351909 | A1 | 12/2017 | Kaehler |
| 2018/0150691 | A1* | 5/2018 | Wu ........................ H04N 5/33 |
| 2018/0165506 | A1* | 6/2018 | George ................ G06F 3/013 |
| 2018/0188807 | A1 | 7/2018 | Cimenser et al. |
| 2018/0255335 | A1* | 9/2018 | George ............ H04N 21/44222 |
| 2018/0332036 | A1 | 11/2018 | Mokhasi |
| 2019/0332758 | A1* | 10/2019 | Yin ........................ G06F 21/32 |
| 2019/0354758 | A1* | 11/2019 | Wu ........................ G06K 9/209 |
| 2020/0089855 | A1* | 3/2020 | Chou .................... G06F 3/013 |

FOREIGN PATENT DOCUMENTS

| | | |
|---|---|---|
| CN | 104036586 A | 9/2014 |
| CN | 104809380 A | 7/2015 |
| CN | 105117627 A | 12/2015 |
| CN | 105847540 A | 8/2016 |
| CN | 105930816 A | 9/2016 |
| CN | 105955491 A | 9/2016 |
| CN | 106056405 A | 10/2016 |
| CN | 106203410 A | 12/2016 |
| CN | 106354251 A | 1/2017 |
| CN | 106407772 A | 2/2017 |
| CN | 106412563 A | 2/2017 |
| CN | 106502384 A | 3/2017 |
| CN | 106534836 A | 3/2017 |
| CN | 106980983 A | 7/2017 |
| CN | 107203045 A | 9/2017 |
| JP | H09-251342 A | 9/1997 |
| JP | H10-040423 A | 2/1998 |
| JP | 2003167855 A | 6/2003 |
| JP | 2017526079 A | 9/2017 |
| KR | 1019980084419 A | 12/1998 |
| KR | 10-2016-0080083 A | 7/2016 |
| WO | 2016/183541 A1 | 11/2016 |

OTHER PUBLICATIONS

Office Action for Taiwanese Application No. 106140069 dated Jul. 22, 2019, 8 pages.
First Search for Chinese Application No. 201710100962.8 dated Apr. 1, 2019, 2 pages.
First Office Action for Chinese Application No. 201710100962.8 dated Apr. 12, 2019, 10 pages.
Written Opinion of the International Searching Authority and the International Search Report for International Application No. PCT/CN2018/076532 dated May 8, 2018, 14 pages.
International Preliminary Report on Patentability for International Application No. PCT/CN2018/076532 dated Sep. 6, 2019, 11 pages.
Search Report for European Application No. 18758261.4 dated Oct. 15, 2019 (5 pages).
"Foveated rendering—Wikipedia," Feb. 4, 2017, retrieved from the internet: https://en.wikipedia.org/w/index.php?title=Foveated_rendering&oldid=763658820, retrieved on Oct. 7, 2019 (2 pages).
Miller, "Nvidia's foveated rendering tricks for VR could improve graphics and immersion—The Verge," Jul. 22, 2016, retrieved from internet: https://www.theverge.com/2016/7/22/12260430/nvidia-foveated-rendering-vr-graphics-smi-eye-tracking-siggraph, retrieved on Oct. 7, 2019 (2 pages).
Examination Report for European Application No. 18758261.4 dated Jan. 9, 2020 (5 pages).
Second Office Action for Chinese Application No. 201710100962.8 dated Jan. 15, 2020 (9 pages).
Written Opinion for Singaporean Application No. 11201907456P dated Jun. 2, 2020.
Office Action for Japanese Application No. 2019-545980 dated Nov. 17, 2020.
Office Action for Korean Application No. 10-2019-7025471 dated Dec. 26, 2020.
Notice of Allowance for Korean Application No. 10-2019-7025471 dated Jul. 29, 2021.

* cited by examiner

VIRTUAL REALITY SCENE-BASED BUSINESS VERIFICATION METHOD AND DEVICE

CROSS-REFERENCE TO RELATED APPLICATION

This application is a continuation application of International Patent Application No. PCT/CN2018/076532, filed on Feb. 12, 2018, which is based on and claims priority of the Chinese Patent Application No. 201710100962.8, filed on Feb. 23, 2017 and entitled "VIRTUAL REALITY SCENE-BASED SERVICE VERIFICATION METHOD AND DEVICE." The above-referenced applications are incorporated herein by reference in their entirety.

TECHNICAL FIELD

This application generally relates to applications of computer techniques, and more specifically, to virtual reality (VR)-based service verification method and device.

BACKGROUND

Virtual Reality (VR) technology is a technology that provides users a vivid three-dimensional immersive scene. It utilizes a computer graphics system and various control interfaces to generate an interactive environment on a computer. The advancements in VR technology and related hardware significantly increase the number of scenarios in which VR technology can be used.

Some identity-sensitive services (e.g., a payment service) require the user to go through a security verification process. While VR technology may provide the user an immersive experience, completing the security verification process in a VR environment without disrupting the immersive experience remains a challenge. Fast and reliable security verification for a target service is imperative to satisfying user experience in a VR application.

SUMMARY

Various embodiments of the present specification can include systems, methods, and non-transitory computer readable media for a VR-based service verification method.

One aspect of this specification is directed to a VR-based service verification method. This method may comprise: detecting a target service triggered by a visual focus of a user in a VR scene, wherein the target service requires security verification; acquiring, by eye recognition hardware, one or more eye physiological features from the user; comparing one of the one or more eye physiological features with a corresponding pre-stored eye physiological feature sample, and determining whether the security verification of the target service has succeeded based on a comparison result.

This method may also include: in response to a determination that the security verification of the target service has failed, comparing one or more other eye physiological features with one or more corresponding pre-stored eye physiological feature samples, and determining whether the security verification of the target service has succeeded based on a comparison result of the one or more other eye physiological features.

In some embodiments, the aforementioned service verification method may further comprise: performing, by eye tracking hardware, eye tracking for the user; determining, based on a result of the eye tracking, the visual focus of the user in the VR scene; determining whether the visual focus has stayed in an area encompassing a virtual component in the VR scene; and, in response to a determination that the visual focus has stayed in the area for longer than a preset threshold, selecting the virtual component and triggering the target service.

In some embodiments, the aforementioned service verification method may further comprise: identifying a center area of a preset size centered on the visual focus in the VR scene; rendering a center image corresponding to the center area based on a first rendering precision; and rendering periphery images corresponding to periphery areas outside the target visual area based on a second rendering precision lower than the first rendering precision.

In some embodiments, in the aforementioned method, the rendering precision for the periphery areas may decrease as distances between the periphery areas and the visual focus increase.

In some embodiments, in the aforementioned service verification method, the one or more eye physiological features may comprise one or more of an eyeprint feature and an iris feature, and the eye recognition hardware may comprise at least one of an RGB camera for acquiring the eyeprint feature and an infrared camera for acquiring the iris feature.

In some embodiments, the target service may be a payment service.

Another aspect of this specification is directed to a VR-based service verification device, comprising eye recognition hardware configured to acquire one or more eye physiological features from a user, one or more processors and one or more non-transitory machine-readable memories coupled to the one or more processors and configured with instructions executable by the one or more processors to cause the one or more processors to: detect a target service triggered by a visual focus of the user in a VR scene, wherein the target service may require security verification; compare one of the one or more eye physiological features with a corresponding pre-stored eye physiological feature sample, and determine whether the security verification of the target service has succeeded based on a comparison result.

In some embodiments, the one or more non-transitory machine-readable memories may be further configured with instructions executable by the one or more processors to cause the one or more processors to: in response to a determination that the security verification of the target service has failed, compare one or more other eye physiological features with one or more corresponding pre-stored eye physiological feature samples, and determine whether the security verification of the target service has succeeded based on a comparison result of the one or more other eye physiological features.

In some embodiments, the aforementioned device may further comprise eye tracking hardware configured to perform eye tracking for the user, and the one or more non-transitory machine-readable memories may be further configured with instructions executable by the one or more processors to cause the one or more processors to: determine, based on a result of the eye tracking, the visual focus of the user in the VR scene; determine whether the visual focus has stayed in an area encompassing a virtual component in the VR scene; and, in response to a determination that the visual focus has stayed in the area for longer than a preset threshold, select the virtual component and trigger the target service.

In some embodiments, the one or more non-transitory machine-readable memories are further configured with instructions executable by the one or more processors to cause the one or more processors to: identify a center area of a preset size centered on the virtual focus in the VR scene; render a center image corresponding to the center area based on a first rendering precision; and render periphery images corresponding to periphery areas outside the target visual area based on a second rendering precision lower than the first rendering precision.

In some embodiments, the rendering precision for the periphery areas may decrease as distances from the periphery areas to the visual focus increase.

In some embodiments, the one or more eye physiological features may comprise one or more of an eyeprint feature and an iris features; and the eye recognition hardware may comprise at least one of an RGB camera for acquiring the eyeprint feature and an infrared camera for acquiring the iris feature.

In some embodiments, the target service may comprise a payment service.

Another aspect of this specification is directed to a non-transitory machine-readable storage medium associated with a VR-based service verification method, configured with instructions executable by one or more processors to cause the one or more processor to: detect a target service triggered by a visual focus of a user in a VR scene, wherein the target service may require security verification; receive one or more eye physiological features from the user acquired by eye recognition hardware; and compare one of the one or more eye physiological features with a corresponding pre-stored eye physiological feature sample, and determine whether the security verification of the target service has succeeded based on a comparison result.

In some embodiments, the storage medium may be further configured with instructions executable by the one or more processors to cause the one or more processor to: in response to a determination that the security verification of the target service has failed, compare one or more other eye physiological features with one or more corresponding pre-stored eye physiological feature samples, and determine whether the security verification of the target service has succeeded based on a comparison result of the one or more other eye physiological results.

In some embodiments, the storage medium may be further configured with instructions executable by the one or more processors to cause the one or more processors to: determine the visual focus of a user in the VR scene based on a result of eye tracking for the user performed by eye tracking hardware; determine whether the visual focus has stayed in an area encompassing a virtual component in the VR scene; and, in response to a determination that the visual focus has stayed in the area for longer than a preset threshold, select the virtual component and trigger the target service.

In some embodiments, the storage medium may be further configured with instructions executable by the one or more processors to cause the one or more processors to: identify a center area of a preset size centered on the visual focus in the VR scene; render a center image corresponding to the center area based on a first rendering precision; and render periphery images corresponding to periphery areas outside the target visual area based on a second rendering precision lower than the first rendering precision.

In some embodiments, the rendering precision for the periphery areas may decrease as distances from the periphery areas to the visual focus increase.

In some embodiments, the one or more eye physiological features may comprise one or more of an eyeprint feature and an iris feature, and the eye recognition hardware may comprise at least one of an RGB camera for acquiring the eyeprint feature and an infrared camera for acquiring the iris feature.

In this application, when a user triggers a target service that requires security verification by controlling a visual focus in the VR scene, the eye recognition hardware in a VR terminal may be used to acquire one or more eye physiological features from the user. One or more of the acquired eye physiological features are compared with one or more corresponding pre-stored eye physiological feature samples, respectively, for security verification of the target service, which may be quickly completed in the VR scene. This method guarantees the security of the service executed by the user in the VR scene, and reduces the complexity of the service security verification process. At the same time, the one or more eye physiological features may have characteristics that are complementary to each other, which minimizes the security verification failure caused by the distortion of acquired eye physiological features, and thus improves the accuracy of the service security verification.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

DETAILED DESCRIPTION OF THE INVENTION

Figure 1:
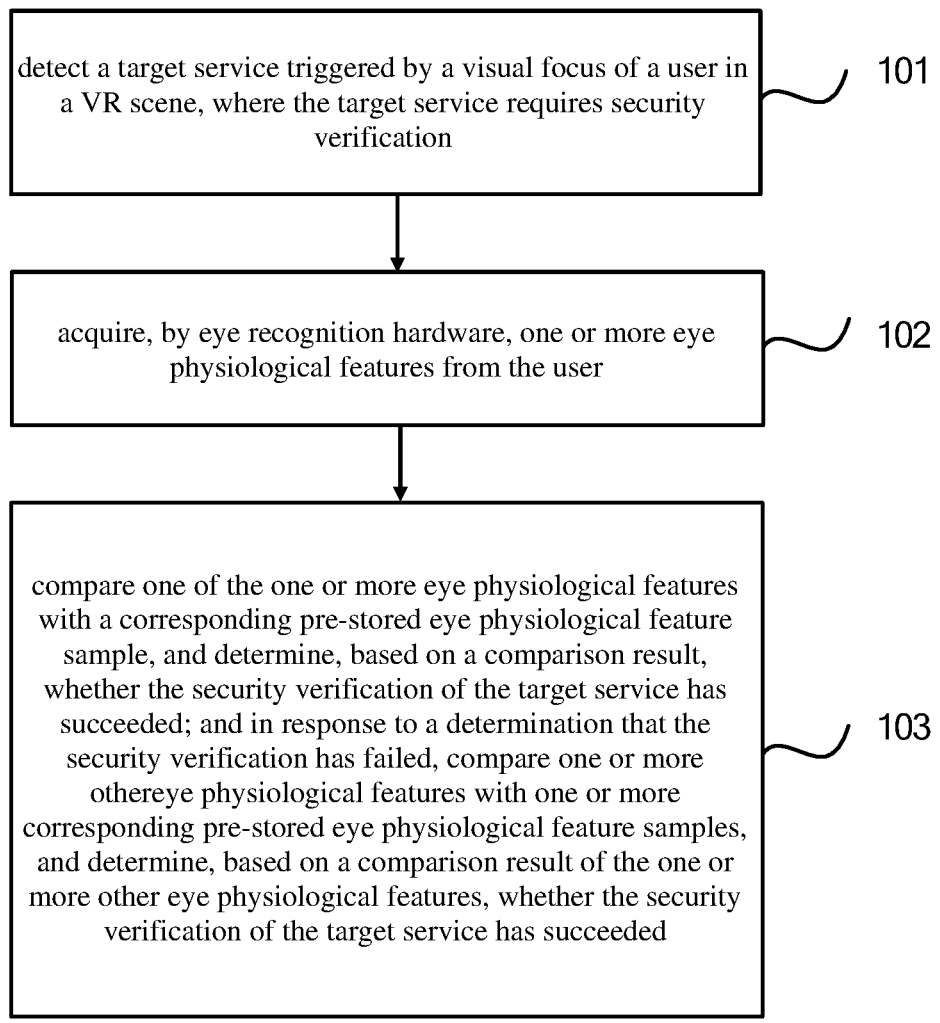
FIG. 1 is a flow diagram of a VR-based service verification method according to an embodiment of this application.

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

This application provides a technical solution that a user, while wearing a VR terminal to enjoy an immersive experience, uses an intuitive interaction mode, such as visual focus control, to quickly trigger a target service that requires security verification. One or more complementary eye physiological features of the user may be acquired by eye recognition hardware in a VR client, and these features may be used to quickly complete the security verification of the target service in a VR scene.

After a VR client detects that a target service requiring security verification has been triggered by the visual focus of a user in a VR scene, the eye recognition hardware may be called to acquire one or more eye physiological features from the user. One of the one or more eye physiological features may first be compared with a corresponding pre-stored eye physiological feature sample to, based on a comparison result, determine whether the security verification of the target service has succeeded. If it is determined that the security verification of the target service has failed, one or more other eye physiological features may be compared with one or more corresponding pre-stored eye physiological feature samples to, based on a comparison result of the one or more other eye physiological features, determine whether the security verification of the target service has succeeded.

In one example, the technical solution of this application may be applied to a fast payment service in a VR scene. In this case, a user may control the position of the visual focus in the VR scene with an intuitive interaction mode (e.g., by rotating his/her eyeballs) to trigger a fast payment service. After the fast payment service in the VR scene is triggered, the VR client may acquire one or more complementary eye physiological features (e.g., eyeprint feature and iris feature) of the user through the eye recognition hardware of the VR terminal. The VR client may quickly complete the security verification for the payment service by comparing the one or more acquired eye physiological features with the eye physiological feature samples previously stored by the user, so that the user no longer needs to rely on conventional interaction modes (e.g., inputting a payment password) in the VR scene to complete the security verification of the payment service. The method disclosed herein may substantially reduce the complexity of the security verification process without jeopardizing the safety of the payment service. Additionally, by using multiple complementary eye physiological features for security verification, the accuracy of the security verification may be improved.

This technical solution is described below with reference to specific embodiments and specific application scenes. FIG. 1 is a diagram of a VR-based service verification method according to an embodiment of this application. As shown in FIG. 1, this method may include the following steps 101 through 103.

In step 101, a target service is detected. The target may be triggered by a visual focus of a user in a VR scene and may require security verification.

In step 102, eye recognition hardware may be used to acquire one or more eye physiological features from the user.

In step 103, one of the one or more eye physiological features may first be compared with a corresponding pre-stored eye physiological feature sample, to determine, based on a comparison result, whether the security verification of the target service has succeeded. If it is determined that the security verification of the target service has failed, one or more other eye physiological features may be compared with one or more corresponding pre-stored eye physiological feature samples, to determine, based on a comparison result of the one or more other eye physiological features, whether the security verification of the target service has succeeded.

In this application, a VR client may refer to client software developed based on VR technology to provide a user a three-dimensional immersive experience. For example, a VR client may be a VR-based Application (APP). A VR client may output a VR scene model to the user through a VR terminal connected with the VR client, so that the user wearing the VR terminal gets the three-dimensional immersive experience.

A target service, which may require security verification, may be executed by the user in the VR scene. The target service may include be a local task or an online task that is initiated by the user in the VR scene and requires security verification.

For example, in one example, the target service may be a fast payment service in a specific VR scene. For example, it may be an order payment in VR shopping, a tip payment in VR live broadcasting, a credit recharge in a VR game, a video-on-demand payment for a VR video, or any other local service requiring security verification (e.g., an unlocking service for a VR terminal).

The technical solution of this application is described below in details through the following four steps: VR scene modeling, triggering of the target service, security verification of the target service, and execution of the target service.

1) VR Scene Modeling

In this embodiment, a VR scene modeling may be conducted using a modeling tool. For example, the VR scene modeling may be conducted using any existing modeling tool such as Unity, 3dsMax, Photoshop, etc. The modeling tools that can be used for the VR scene modeling in this application are not limited herein.

In VR scene modeling, the VR scene model and the texture mapping of the VR scene may be derived from an actual scene in reality. For example, a material texture map and a planar model of the real scene may be acquired by a camera in advance, and a modeling tool such as Photoshop or 3dmax may be used to process the textures and construct a three-dimensional (3D) model of the real scene. The textures and the 3D model then may be imported into a unity3D platform (U3D), in which image rendering may be done through sound effects, graphical interfaces, plug-ins, light, etc. Finally, interactive functionalities may be added to complete the VR scene modeling.

In this embodiment, besides the VR scene modeling, a 2D or 3D service interface corresponding to the target service may be created through which the user can execute a target service in the VR scene. The service interface may be created using any of the aforementioned modeling tools.

For example, in one embodiment, the service interface may be a fast payment interface (e.g., a virtual checkout interface) created using a modeling tool. The user may interact with the fast payment interface through a specific interaction operation (e.g., positioning an operation focus into the payment interface) to complete fast payment in the VR scene.

2) Triggering of the Target Service

In this embodiment, after the VR scene modeling and the service interface have been created, the VR client may output the VR scene model and the service interface to the user through a VR terminal (e.g., a VR helmet) connected with the VR client.

By default, the VR client may only output the VR scene model to the user. While immersing in the VR scene, the user may interact with the VR client to trigger a target service, and the VR client may output the service interface in the VR scene.

In this application, to ensure that a user may quickly and intuitively trigger a target service, a visual focus control mechanism may be introduced in the VR client. While wearing the VR terminal to enjoy the immersive experience, the user may control the position of the visual focus in the VR scene by an intuitive interaction mode, such as rotating his/her eyeballs, to trigger a target service (e.g., a fast payment service). In one embodiment, the VR client may carry eye tracking hardware. While the user wearing the VR terminal enjoying the immersive experience, eye tracking can be executed using the eye tracking hardware through an accompanying eye tracking algorithm. Then the visual focus of the user in the VR scene may be determined based on an eye tracking result, and a corresponding prompt may be outputted to the user at a position corresponding to the visual focus in the VR scene.

The eye tracking hardware may include a visual module for acquiring eye physiological features from the user. In one embodiment, the visual module may include a camera and an accompanying LED light source for light compensation when acquiring the eye physiological features from the user.

In one example, the VR client may conduct eye tracking of a user in the following procedures. First, the visual module may be used to capture an eye image of the user, then a preliminarily position of the eyes of the user in the eye image may be determined using the eye tracking algorithm. Then, based on the specific eye physiological features (e.g., eyeprint feature or iris feature) of the user, accurate position of the eyeball of the user may be determined.

After accurate position of the eyeballs of the user is determined, a line of sight of the user may be further calculated using a corresponding algorithm. Based on the line of sight, screen coordinates of the visual focus of the user in the screen of the VR terminal may be calculated, and then the calculated screen coordinates of the visual focus in the screen of the VR terminal may be converted into scene coordinates corresponding to the VR scene model based on a conversion relationship between the coordinate system of the screen of the VR terminal and the coordinate system of the VR scene model. The converted scene coordinates may be the location of the visual focus of the user in the VR scene.

The type of the camera in the visual module generally may depend on the type of the eye physiological feature used by the eye tracking algorithm to accurately position the eyeballs of the user. For example, when the eye tracking algorithm uses the iris feature to accurately position the eyeballs of the user, the camera in the visual module may be an infrared camera and the LED lamp may be an infrared LED lamp since the iris acquisition is conducted under an infrared illumination condition. Similarly, when the eye tracking algorithm uses the eyeprint feature to accurately position the eyeballs of the user, the camera in the visual module may be a regular RGB camera and the LED lamp may be a regular LED lamp since the eyeprint acquisition is conducted in a visible lighting environment.

In this embodiment, the eye tracking may simulate actual visual experiences of a user. Therefore, after the visual focus of the user in the VR scene has been determined by the eye tracking process described above, visual rendering of different areas in the VR scene may be conducted differently according to their relative positions to the visual focus. Doing so may minimize the image rendering cost in the VR scene model without affecting the visual experience of the user.

After the visual focus of the user in the VR scene is determined, the VR client may identify a center area of a preset size centered on the visual focus in the VR scene. The size and shape of the center area may be determined based on the actual need. For example, the center area may be a circular area centered on the visual focus and having a radius of a pre-determined length.

After the center area is determined, the VR client may render a center image corresponding to the center area with a relatively high first rendering precision (e.g., 100% rendering). At the same time, periphery areas that are further away from the visual focus, such as the areas outside the center area, may be rendered with a second rendering precision lower than the first rendering precision.

Additionally, in order to further reduce the image rendering cost in the VR scene model, periphery areas outside the center area may be rendered with gradient decreasing precisions. In one embodiment, the VR client may divide the area outside the center area into a plurality of subareas according to their distance to the visual focus, and sets different rendering precisions based on distances between each subarea and the visual focus. More specifically, the rendering precision of each subarea may decrease as its distance to the visual focus increases. That is, the farther away a subarea to the visual focus, the lower its rendering precision.

In this embodiment, the VR scene model may provide a virtual component for triggering the target service. While enjoying an immersive experience in the VR scene, the user may execute a target service by controlling his/her visual focus to stay in the area encompassing the virtual component, and select the virtual component by a stay-timeout mechanism to trigger the target service.

In some embodiments, after the visual focus of the user in the VR scene is determined by eye tracking, the VR client may further track the movement of the visual focus and determine whether the visual focus has stayed in an area encompassing the virtual component. If it is determined that the visual focus has stayed in the area encompassing the virtual component, the VR client may set the virtual component to an operable state (e.g., by highlighting the virtual component), enable a timer for counting the stay time of the visual focus, and check whether the stay time has reaches a preset threshold (the preset threshold is customizable based on the requirements). If the stay time has reaches the preset threshold, the virtual component is selected and the target service is triggered.

For example, in a VR scene, a virtual component may be a preset virtual button provided by the VR client, which may be used to trigger a target service in the VR scene. To execute the target service, the user may, without disrupting from the immersive experience in the VR scene, intuitively (e.g., by rotating his/her eyeballs) move his/her visual focus to stay in an area encompassing the virtual component for sufficiently long period of time (i.e., longer than a preset threshold) to select the virtual component to trigger the target service in the VR scene.

Obviously, other than using the visual focus to trigger the target service as described above, the target service may also be triggered by other forms. For example, a user may directly interact with (e.g., click) the virtual component through a three-dimensional gesture or a head gesture to select the virtual component to trigger the target service. Alternatively, a user may control the movement of an operation focus through a control device (e.g., a handle, a joystick, etc.) connected to the VR terminal to select the virtual component to trigger the target service. A voice recognition module may be installed in the VR terminal, and a target service may be triggered by voice commands through the voice recognition module.

3) Security Verification of the Target Service

In some embodiments, in order to provide a fast security verification process when the user executes a target service in a VR scene, one or more eye physiological features of the user who initiates the service may be acquired. The acquisition of the eye physiological features may be conducted by eye recognition hardware of the VR terminal in combination with certain acquisition algorithms for the eye physiological features. The one or more eye physiological features may be complementary with each other in their characteristics so that the security verification process of the target service may be completed quickly.

The one or more eye physiological features may include an eyeprint feature and an iris feature of the user. The acquisition algorithms for the eye physiological features may include an iris acquisition algorithm and an eyeprint acquisition algorithm preset by the VR client. The eye recognition hardware may include one or more lenses of the VR terminal carried corresponding to the eyes of the user, a visual module for acquiring the eyeprint feature, and a visual module for acquiring the iris feature.

The visual module for acquiring the eyeprint feature may include an RGB camera used in combination with the lens, and an LED light source used in combination with the RGB camera for light compensation for the RGB camera. The visual module for acquiring the iris feature may include an infrared camera used in combination with the lens, and an infrared LED light source used in combination with the infrared camera for light compensation for the infrared camera. That is, in this application, the VR terminal may simultaneously carry an RGB camera for acquiring the eyeprint feature and an infrared camera for acquiring the iris feature. In one example, the RGB camera and the infrared camera may be respectively mounted at positions corresponding to one of the eyes of the user in the VR terminal.

The specific mounting positions of the RGB camera and the infrared camera of the visual modules in the VR terminal are not limited in this application. In one embodiment, the cameras may be positioned on the outer surface of the lens corresponding to the eyes of the user (i.e., the lens is ensured to be located between the eyes of the user and the cameras), face the eyeballs of the user, and are tilted upwardly by a certain angle (e.g., 60 degrees, etc.). In order to reduce the hardware cost of the VR terminal, a same visual module may be used for the eye tracking hardware and for acquiring the eye physiological features of the user. For example, when tracking the eye movement based on the eyeprint feature of a user, the eye tracking hardware may use the same visual module used for acquiring the eyeprint feature. Similarly, when tracking the eye movement based on the iris feature of a user, the eye tracking hardware may use the same visual module used for acquiring the iris feature.

The eye recognition hardware and the eye tracking hardware on the VR terminal may be internal hardware integrated with the VR terminal. They may also be external hardware connected to the VR terminal or hardware of a third-party mobile device (e.g., a smart phone) connected to the VR terminal. Detail composition and setup of these hardware are not limited in this application.

In some embodiments, when using the eye recognition hardware to acquire the eye physiological features of the user, the VR client may use an ambient light detector (e.g., a light sensor) to detect the brightness of the internal environment of the VR terminal to obtain a brightness value. The brightness value may be compared with a brightness threshold to determine whether additional light compensation is necessary. For example, if the detected brightness value is lower than the brightness threshold, the brightness of the internal environment of the VR terminal may be too low for accurate acquisition. In this case, the VR client may immediately turn on a LED light to provide additional light compensation for the camera.

Next, detail procedures of using eye physiological features to conduct security verification for a target service initiated by a user are elaborated below. In the following descriptions, eyeprint feature and iris feature will be used as exemplary eye physiological features. Other eye physiological features may also be used, and this application is not limited herein.

In some embodiments, a user may first register his own eyeprint feature and iris feature in advance through the VR client, so as to establish a binding relationship between the user's account information and his/her eyeprint feature and iris feature on a business server. The user's account information may include a service account used when the user executes the target service.

For example, when the target service is a payment service, a user's account information may include a payment account of the user, and the user may bind the payment account with his/her eyeprint feature and iris feature by registering the eyeprint feature and iris feature.

After the eyeprint and iris registration is completed, the user may use his/her own eyeprint feature and iris feature in the VR scene to carry out fast security verification on the target service he/she initiates, and the user no longer needs to input the information such as a service password to verify the target service.

In some embodiments, when registering eyeprint and iris features, a user may first log in to the VR client using his/her account information, and complete eyeprint and iris features acquisition following instructions provided by the VR client to the VR scene. The VR client then may send, as a registration message, the acquired eyeprint feature and iris feature along with the login account used by the user to a business server. Upon receiving the registration message sent from the VR client, the business server may treat the received eyeprint feature and iris feature as an sample eyeprint feature and an sample iris feature, respectively, and establish a mapping relationship between the samples and the login account of the user. The mapping relationship may be stored in a feature database.

In some embodiments, in order to improve the security of the eyeprint and iris registration, the VR client may request identity verification of the user before sending the registration message to the business server. For example, the VR client may request the user to provide a login password or other information that can prove his/her identity for verification purpose. Upon a successful identify verification, the VR client may send the registration message to the business server to complete the eyeprint and iris registration. Doing so may prevent an user from binding his/her own eyeprint or iris feature with another user's account without authorization, thereby improving the security of the eyeprint and iris registration.

After the registration of the eyeprint and iris features is completed, the registered eyeprint and iris features may be used in a security verification process on a target service, which may be triggered by the user through controlling his/her visual focus in the VR scene.

Conventional security verification processes typically rely on one single feature to verify user identity. In order to further improve the accuracy of security verification of user identity based on the eye physiological features, this application proposes a technical solution of combining one or more eye physiological features of the user for user identity verification.

In an example where the one or more eye physiological features are the eyeprint feature and iris feature, the eyeprint feature and the iris feature may be used simultaneously for security verification because eyeprint feature and iris feature have complementary characteristics.

Iris feature has a drawback that it may be easily distorted if the user is wearing color contact lenses or has certain eye diseases such as cataract. Thus, compared to iris feature, security verification using eyeprint feature may provide more consistent results and is applicable to a larger group of users. However, eyeprint-based verification has its own drawback that the eyeprint feature need to be acquired under a sufficiently bright lighting condition, which might not be guaranteed within a VR terminal, even if a light compensation module is provided.

On the other hand, the acquisition of iris feature may be conducted using infrared light, which can be completed in a less strict lighting condition than that for eyeprint acquisition. The iris feature also has a higher biological uniqueness than the eyeprint feature. However, the drawback of iris-based recognition is that, as mentioned above, the iris feature may be distorted by a user's decoration (e.g., color contact lenses) or pathological condition (e.g., eye diseases such as cataract), leading to inaccurate identity verification result.

Thus, by combining iris-based recognition and eyeprint-based recognition, the advantages of these features may be fully exploited while their weakness may be mitigated, at least to some extent, by each other. Thus the accuracy of the user identity verification may be substantially improved.

In this embodiment, when a user wearing a VR terminal successfully triggers a target service in a VR scene, the VR client may use eye recognition hardware to acquire the user's eyeprint feature and iris feature.

In some embodiments, the VR client may conduct a life detection for the user wearing the VR terminal before acquiring eyeprint feature and iris feature. That ensures that it is an actual user that is using the VR terminal, which prevents attempts to bypass the security verification using fake eyeprint feature and iris feature of the user (e.g., those from a picture of an eye).

In one example, the life detection on the user may be done by blink recognition, heartbeat recognition, etc. The methods that the VR client can use to for life detection on the user wearing the VR terminal are not limited herein.

After the life detection on the user is completed, the VR client may output, in the view of the user in the VR scene, a text prompt message for acquiring eye physiological features of the user to inform the user the acquisition of the eye physiological features (e.g., the eyeprint feature) for the security verification of the target service. For example, when the target service is a VR-based fast payment service, the VR client may output a text prompt message of "Please scan eyeprints and irises to complete the payment verification" in the view of the user in the VR scene.

In some embodiments, upon successfully acquiring the eyeprint feature and the iris feature from the user through the eye recognition hardware, the VR terminal may communicate with the business server based on the acquired eye features to complete the security verification of the target service.

In some embodiments, the business server may enable eyeprint and iris recognition services, and provide a recognition interface to the VR client. For example, when the business server is a business platform based on a server cluster, a recognition server for providing eyeprint and iris recognition services to the VR client may be provided, and an access interface may be provided to the VR client.

Upon successfully acquiring the eyeprint feature and the iris feature of the user, the VR client may construct an eyeprint verification request based on the account information currently used by the user to log in to the VR client and the acquired eyeprint feature and iris feature of the user. The VR client then may access the eyeprint recognition interface provided by the business server and submit the eyeprint recognition request to the business server.

Upon receiving the eyeprint verification request from the VR client, the business server may analyze the eyeprint verification request to obtain the eyeprint feature, the iris feature and the account information of the user in the request. The business server then may search, based on the account information, an eyeprint feature sample and an iris feature sample registered by the user in the feature database, and compare the eyeprint feature and the iris feature with the eyeprint feature sample and the iris feature sample registered by the user and stored in the feature database.

In some embodiments, by default, the business server may only acquire one of the eyeprint feature and the iris feature of the user to compare with the corresponding feature sample in the feature database, and determine, based on a comparison result, whether the security verification of the target service has succeeded. For example, the business server may only compare the eyeprint feature with the eyeprint feature sample registered by the user in the feature database, or only compare the iris feature with the iris feature sample registered by the user and stored in the feature database. The default eye physiological feature used by the business server and the order of comparison are not limited herein.

After the business server compares one of the eyeprint feature and the iris feature of the user with the corresponding feature sample in the feature database, it may determine that the security verification of the target service has succeeded and then return the verification result to the VR client if the features being compared are identical.

On the other hand, after the business server compares one of the eyeprint feature and the iris feature of the user with the corresponding feature sample in the feature database, it may determine that the security verification of the target service has failed if the features being compared are distinct (which may be caused by the distortion of the acquired eye physiological feature). In that case, the business server may continue to use the other eye physiological feature to compare with the corresponding feature sample in the feature database, and determines, based on a comparison result of the other eye physiological feature, whether the security verification of the target service has succeeded.

If, after the comparison, it is determined that the other eye physiological feature is identical to the corresponding eye physiological feature sample registered by the user, the business server may determine that the security verification of the target service has succeeded, and return a corresponding verification result to the VR client. Otherwise, if the other eye physiological feature is different from the corresponding eye physiological feature sample registered by the user, the business server may determine that the security verification of the target service has failed, and return a corresponding verification result to the VR client.

The verification result returned by the business server to the VR client may be a Boolean value (i.e., false and true). For example, when the security verification has succeeded, the business server may return a true value to the VR client; otherwise, if the security verification has failed, the business server may return a false value to the VR client.

In some embodiments, other than working as a sole decisive factor in determining whether the security verification of a target service has succeeded, the comparison result of the one or more acquired eye physiological features with corresponding eye physiological feature samples registered by the user may also be used as at least a partial reference in security verification in applications with enhanced security requirements. Here, "at least a partial reference" means, when determining whether the security verification has succeeded, the comparison result can be either a sole decisive factor or one of a plurality of factors for determining whether the security verification of the target service has succeeded.

In one example, if the comparison result is used as a sole decisive factor for determining whether the security verification of the target service has succeeded, the security verification of the target service may be determined to be succeeded if the comparison result is true (i.e., the two features being compared are identical).

In another example, if the comparison result is used as one of a plurality of factors for determining whether the security verification of the target service has succeeded, and the comparison result is true, further security verification of the target service based on other factors may still be needed. The security verification may be determined to be succeeded if the further security verification is passed. The specific method of further security verification on the target service is not limited in this application, and can be customized based on actual service requirements.

For example, if the target service is a fast payment service in a VR scene, when the acquired eyeprint feature of the user is identical to the eyeprint sample registered by the user, the VR client may also consider whether any other types of security risks are associated with the user currently logs in to the VR client (e.g., whether the login account used by the user is a bound account commonly used by the VR client, or whether the VR terminal where the VR client is located is a VR terminal frequently used by the user, etc.). Then the VR client may ask the user to provide verification information such as a password or a verification code for verifying the user's identity or authorization to the VR terminal, so as to execute further security verification on the fast payment service. After the security verification has succeeded, the VR client may determine that the fast payment service has passed the security verification, and successfully complete the fast payment.

In the aforementioned embodiments, the acquired eyeprint feature and iris feature of the user may be uploaded to the business server to perform security verification on the target service initiated by the user based on the eyeprint feature and the iris feature. Alternatively, in some embodiments, the security verification of the target service may also be conducted locally by the VR client.

In this case, a user may store the eyeprint feature and the iris feature locally at the VR client. Upon receiving the eyeprint feature and the iris feature from the user, the VR client may locally bind the eyeprint feature and the iris feature with the account information of the user.

After the user triggers a target service in the VR scene, the VR client may acquire the eyeprint feature and the iris feature of the user, and verify whether the security verification of the target service has succeeded using the same process as that conducted by the business server, which is not repeated here.

4) Execution of the Target Service

In some embodiments, after the security verification of the target service has succeeded, the VR client may execute the target service.

When the target service is an online service, the VR client may execute the service through further business communications with the business server.

In some embodiments, the VR client may receive the security verification result of the target service returned from the business server. If the security verification has succeed (e.g., a true value is returned), the VR client may provide a service interface corresponding to the target service in the VR scene and construct a service request by acquiring service parameters related to the target service through the service interface. Through a business access interface provided by the business server to the VR client, the VR client may submit the service request to the business server, and further interact with the business server to complete the target service.

For example, when the target service is a fast payment service in a VR scene, the VR client may output a payment interface, acquire service parameters related to the payment service such as user information, order information and price information through the payment interface, and then construct a corresponding payment request. The VR client may send the payment request to the business server for the business server to process the payment request to complete the payment process.

Obviously, if the target service is a local service of the VR client, the service may be executed locally in response to the result that the local service security verification has succeeded. For example, when the target service is a local unlocking service for a VR terminal, if the VR client installed in the VR terminal compares the acquired eyeprint feature of the user with the eyeprint feature sample registered by the user and finds a complete match, the VR terminal may be directly unlocked.

Detail technical implementation of this application is described below, using an example of a user making a fast and secure payment in a VR shopping application. In this example, eye recognition hardware of a VR terminal is used to scan the eyeprint feature and iris feature of the user. Apparently, this example is only exemplary and does not intend to limit the scope of this application, and the technical solution of this application may also be applied to other similar service scenarios. For example, using his/her eyeprint, a user may recharge game currency in a VR game, send a tip payment in a VR live broadcasting, pay a video on-demand fee in a VR video, or unlock a VR terminal. Possible service scenarios are not exhaustively enumerated in this application.

In this example, the target service may be a fast payment service based on a VR scene, the VR client may be a payment client developed based on VR technology (e.g., VR pay of Alipay), and the business server may be a payment server (e.g., an Alipay platform constructed based on a server cluster).

In this example, in an initial state, a user may log in to a VR client using his/her payment account, complete the registration of eyeprint and iris features through the VR client, bind his/her eyeprint and iris features with the payment account, and store the binding relationship to the feature database in the payment server in the cloud. The specific registration process is similar to that described previously and is not repeated here. Once the feature registration is completed, the user may complete fast security payment using his/her eyeprint and iris features in the VR scene.

While wearing the VR terminal to enjoy a VR shopping experience, a user may be presented an inventory comprising a number of available merchandizes in the VR scene. The user may browse the inventory and select a merchandize of his/her choice for purchase.

After selecting a merchandize from the inventory, the user may control the position of the visual focus in the VR scene through an intuitive interaction mode such as eyeball rolling. The visual focus may be controlled to stay over a "payment" button provided in advance in the VR scene for a sufficiently long period of time (e.g., N seconds) to trigger the VR client to start a payment process.

After the payment process has started, the VR client may first execute a life detection on the user. After a satisfying life detection result is received, a prompt message of "Please scan eyeprint and iris to complete the payment verification" may be displayed in the view of the user in the VR scene.

Upon the completion of the eyeprint and iris features acquisition, the VR client may construct a verification request based on the acquired eyeprint feature, iris feature, and the login account used by the user to log in to the VR client. The VR client then may submit the verification request to the payment server. The payment server may compare one of the eyeprint feature and the iris feature of the user with the corresponding eye physiological feature sample registered by the user. If the features being compared are identical, the security verification of the payment service has succeeded, and the payment server may return a Boolean true value to the VR client. Otherwise, the payment server may further compare the other eye physiological feature of the eyeprint feature and the iris feature with the corresponding eye physiological feature sample registered by the user. If the features being compared are identical, the security verification of the payment service has succeeded, and the payment server may return a Boolean true value to the VR client.

Upon receiving a result returned by the payment server that the security verification has succeeded, the VR client may output a payment interface, acquire parameters related to the payment service (e.g., user information, order information and price information) through the payment interface, construct a corresponding payment request, and send the payment request to the payment server. The payment server may process the payment request to complete the payment process for the merchandize.

In some embodiments, a transaction category of "verification-exempted small transaction" may be provided to expedite the payment process. In some embodiments, when a user triggers the payment process for a selected merchandize through, for example, a voice command, the VR client may check the payment amount, and verify whether the payment amount is lower than a preset amount (e.g., 200 Chinese Yuan). If the payment amount is lower than the preset amount, the VR client may directly construct a payment request without going through the security verification and send the payment request to the payment server. The payment server may process the payment request to complete the payment for the merchandize. If the payment amount is higher than the preset amount, the VR client may complete the security verification of the payment service using the eyeprint feature and the iris feature of the user. The detail procedures are the same as those described above and are not repeated here.

It is worth noting that the techniques involved in the payment in the embodiment of this application may include, for example, Near Field Communication (NFC), WIFI, 3G/4G/5G, POS card swiping technology, two-dimensional code scanning technology, bar code scanning technology, Bluetooth, infrared imaging, Short Message Service (SMS), Multimedia Message Service (MMS), etc.

Corresponding to the embodiments of the aforementioned service verification method, this application further provides a service verification device.

Figure 2:
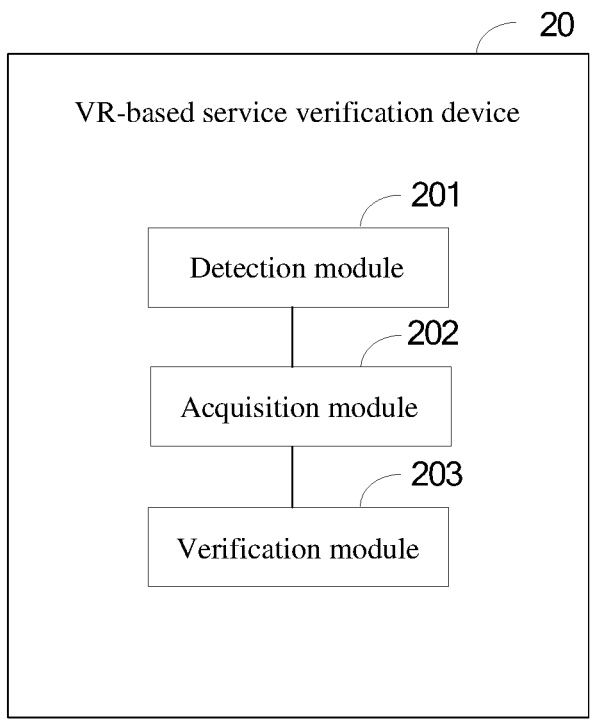
FIG. 2 is a logic block diagram of a VR-based service verification device according to an embodiment of this application.

FIG. 2 is a logic block diagram of a VR-based service verification device according to an embodiment of this application. As shown in FIG. 2, the device 20 may include: a detection module 201, configured to detect a target service triggered by a visual focus of a user in a VR scene, wherein the target service may require security verification; an acquisition module 202, configured to use eye recognition hardware to acquire one or more eye physiological features from the user; and a verification module 203, configured to compare one of the one or more eye physiological features with a corresponding pre-stored eye physiological feature sample, and determine, based on a comparison result, whether the security verification of the target service has succeeded; and, if it is determined that the security verification of the target service has failed, comparing one or more other eye physiological features with one or more corresponding pre-stored eye physiological feature samples, and determine, based on a comparison result of the one or more other eye physiological features, whether the security verification of the target service has succeeded.

In some embodiments, the device 20 may further include: a trigger module (not shown in FIG. 2), configured to use eye tracking hardware to execute eye tracking for the user; determine, based on a result of the eye tracking, the visual focus of the user in the VR scene; determine whether the visual focus has stayed in an area encompassing a virtual component in the VR scene; and, in response to a determination that the visual focus has stayed in the area for longer than a preset threshold time, select the virtual component and trigger the target service.

In some embodiments, the device 20 may further include: a rendering module, configured to identify a center area of a preset size centered on the visual focus in the VR scene; render a center image corresponding to the identified center area based on a first rendering precision; and render periphery images corresponding to periphery areas outside the target visual area based on a second rendering precision lower than the first rendering precision.

In some embodiments, the rendering precision for the periphery areas may decrease as distances between the periphery areas and the visual focus increase.

In some embodiments, the verification module 203 may be configured to: determine, at least partially based on a result of comparing the acquired eye physiological feature with the eye physiological feature sample, whether the security verification of the target service has succeeded.

In some embodiments, the one or more eye physiological features may include an eyeprint feature and an iris feature. The eye recognition hardware may include an RGB camera for acquiring the eyeprint feature and an infrared camera for acquiring the iris feature.

In some embodiments, the target service may include a payment service.

Figure 3:
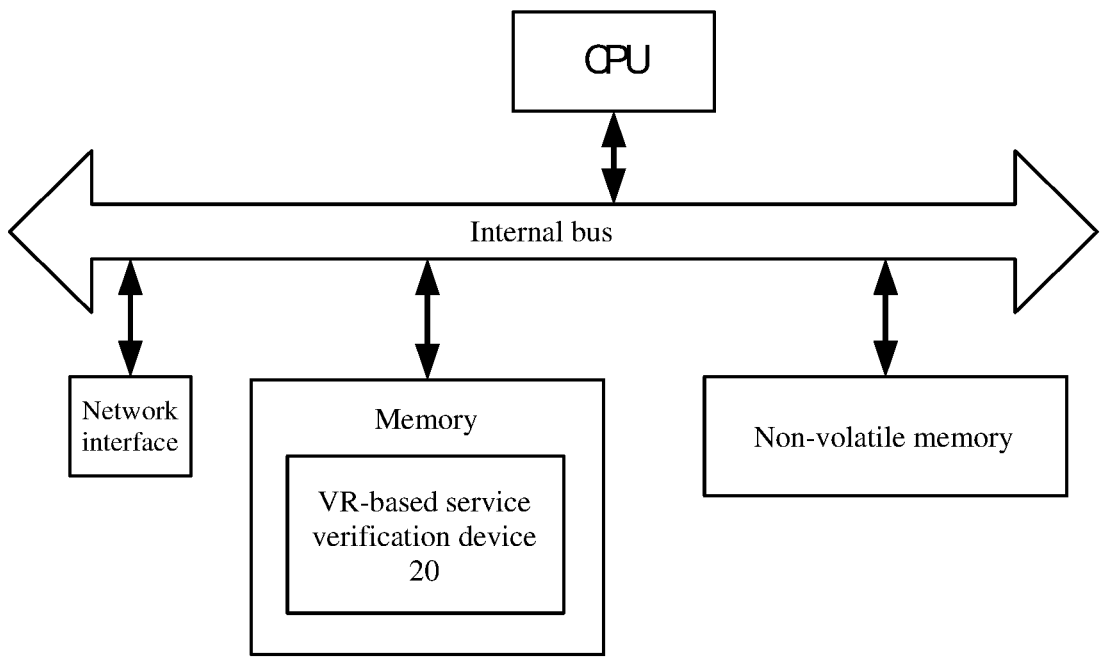
FIG. 3 is a hardware structure diagram of a VR terminal carrying the VR-based service verification device according to an embodiment of this application.

FIG. 3 is a hardware structure diagram of a VR terminal carrying the VR-based service verification device according to an embodiment of this application. Referring to FIG. 3, the hardware architecture of a VR terminal equipment bearing the VR-based service verification device 20 may include a CPU, a memory, a non-volatile storage, a network interface, an internal bus, etc. Taking software implementation as an example, the VR-based service verification device 20 may be considered a logic device combining hardware and software, formed by the CPU running a computer program stored in the memory.

Other embodiments of this application will be apparent to those skilled in the art based on the descriptions in the specification and experimenting the disclosed embodiments. This application is intended to cover any variations, uses, or adaptations of this application following the general principles thereof and including such departures from this application as come within known or customary practice in the art. It is intended that the specification and examples be considered as exemplary only, with a true scope and spirit of this application being indicated by the following claims.

It will be appreciated that this application is not limited to the exact construction that has been described above and illustrated in the accompanying drawings, and that various modifications and changes can be made without departing from the scope thereof. It is intended that the scope of this application only be limited by the appended claims.

The foregoing descriptions are merely exemplary embodiments of this application, but are not intended to limit this application. Any modification, equivalent replacement, or improvement made without departing from the spirit and principle of this application should fall within the protection scope of this application.

What is claimed is:

1. A virtual reality (VR)-based service verification method, comprising:
    detecting a target service triggered by a visual focus of a user in a VR scene, wherein the target service requires security verification;
    conducting a life detection for the user by blink recognition or heartbeat recognition;
    acquiring, in response to the user passing the life detection and by eye recognition hardware, eye physiological features from the user, wherein the eye physiological features include an eyeprint feature and an iris feature acquired within a same period of time, the eye recognition hardware includes an RGB camera and an infrared camera, the eyeprint feature is acquired by the RGB camera, and the iris feature is acquired by the infrared camera; and
    comparing the eyeprint feature and the iris feature in the eye physiological features with a corresponding pre-stored eye physiological feature sample, and determining, based on a comparison result, whether the security verification of the target service succeeds.

2. The method of claim 1, further comprising:
    in response to a determination that the security verification of the target service fails, comparing one or more other eye physiological features with one or more corresponding pre-stored eye physiological feature samples; and
    determining, based on a comparison result of the one or more other eye physiological features, whether the security verification of the target service succeeds.

3. The method of claim 1, further comprising:
    performing, by eye tracking hardware, eye tracking for the user;
    determining, based on a result of the eye tracking, the visual focus of the user in the VR scene;
    determining whether the visual focus has stayed in an area encompassing a virtual component in the VR scene; and
    in response to a determination that the visual focus has stayed in the area for longer than a preset threshold, selecting the virtual component and triggering the target service.

4. The method of claim 1, further comprising:
    identifying a center area of a preset size centered on the visual focus in the VR scene;
    rendering a center image corresponding to the center area based on a first rendering precision; and
    rendering periphery images corresponding to periphery areas outside the center area based on a second rendering precision lower than the first rendering precision.

5. The method of claim 4, wherein the rendering precision for the periphery areas decreases as distances between the periphery areas and the visual focus increase.

6. The method of claim 1, wherein the target service comprises a payment service.

7. A Virtual Reality (VR)-based service verification device, comprising:
    eye recognition hardware including an RGB camera and an infrared camera;
    one or more processors and one or more non-transitory machine-readable memories coupled to the one or more processors and configured with instructions executable by the one or more processors to cause the one or more processors to:
        detect a target service triggered by a visual focus of a user in a VR scene, wherein the target service requires security verification,
        conduct a life detection for the user by blink recognition or heartbeat recognition, wherein the eye recognition hardware is configured to acquire, in response to the user passing the life detection, eye physiological features from the user, wherein the eye physiological features include an eyeprint feature and an iris feature acquired within a same period of time, the eyeprint feature is acquired by the RGB camera, and the iris feature is acquired by the infrared camera, and
        compare the eyeprint feature and the iris feature in the physiological features with a corresponding pre-stored eye physiological feature sample, and determine, based on a comparison result, whether the security verification of the target service succeeds.

8. The device of claim 7, wherein the one or more non-transitory machine-readable memories are further configured with instructions executable by the one or more processors to cause the one or more processors to:
    in response to a determination that the security verification of the target service fails, compare one or more other eye physiological features with one or more corresponding pre-stored eye physiological feature samples; and
    determine, based on a comparison result of the one or more other eye physiological features, whether the security verification of the target service succeeds.

9. The device of claim 7, further comprising:
    eye tracking hardware configured to perform eye tracking for the user, wherein the one or more non-transitory machine-readable memories are further configured with instructions executable by the one or more processors to cause the one or more processors to:
- determine, based on a result of the eye tracking, the visual focus of the user in the VR scene;
- determine whether the visual focus has stayed in an area encompassing a virtual component in the VR scene; and
- in response to a determination that the visual focus has stayed in the area for longer than a preset threshold, select the virtual component and trigger the target service.

10. The device of claim 7, wherein the one or more non-transitory machine-readable memories are further configured with instructions executable by the one or more processors to cause the one or more processors to:
- identify a center area of a preset size centered on the visual focus in the VR scene;
- render a center image corresponding to the center area based on a first rendering precision; and
- render periphery images corresponding to periphery areas outside the center area based on a second rendering precision lower than the first rendering precision.

11. The device of claim 10, wherein the rendering precision for the periphery areas decreases as distances between the periphery areas and the visual focus increase.

12. The device of claim 7, wherein the target service comprises a payment service.

13. A non-transitory machine-readable storage medium associated with a virtual reality (VR)-based service verification method, configured with instructions executable by one or more processors to cause the one or more processors to:
- detect a target service triggered by a visual focus of a user in a VR scene, wherein the target service requires security verification;
- conduct a life detection for the user by blink recognition or heartbeat recognition;
- receive, response to the user passing the life detection, eye physiological features of the user acquired by eye recognition hardware, wherein the eye physiological features include an eyeprint feature and an iris feature acquired within a same period of time, the eye recognition hardware includes an RGB camera and an infrared camera, the eyeprint feature is acquired by the RGB camera, and the iris feature is acquired by the infrared camera; and
- compare the eyeprint feature and the iris feature in the eye physiological features with a corresponding pre-stored eye physiological feature sample, and determine, based on a comparison result, whether the security verification of the target service succeeds.

14. The storage medium of claim 13, further configured with instructions executable by the one or more processors to cause the one or more processors to:
- in response to a determination that the security verification of the target service fails, compare one or more other eye physiological features with one or more corresponding pre-stored eye physiological feature samples; and
- determine, based on a comparison result of the one or more other eye physiological features, whether the security verification of the target service succeeds.

15. The storage medium of claim 13, further configured with instructions executable by the one or more processors to cause the one or more processors to:
- determine, based on a result of eye tracking for a user performed by eye tracking hardware, the visual focus of the user in the VR scene;
- determine whether the visual focus has stayed in an area encompassing a virtual component in the VR scene; and
- in response to a determination that the visual focus has stayed in the area for longer than a preset threshold, select the virtual component and trigger the target service.

16. The storage medium of claim 13, further configured with instructions executable by the one or more processors to cause the one or more processors to:
- identify a center area of a preset size centered on the visual focus in the VR scene;
- render a center image corresponding to the center area based on a first rendering precision; and
- render periphery images corresponding to periphery areas outside the center area based on a second rendering precision lower than the first rendering precision.

17. The storage medium of claim 16, wherein the rendering precision of the periphery areas decreases as distances between the periphery areas to the visual focus increase.

* * * * *